United States Patent [19]

Abe

[11] Patent Number: 5,095,382
[45] Date of Patent: Mar. 10, 1992

[54] WIRELESS HEADPHONE

[75] Inventor: Kensasku Abe, Saitama, Japan

[73] Assignee: Sony Corporation, Tokyo, Japan

[21] Appl. No.: 493,289

[22] Filed: Mar. 14, 1990

[30] Foreign Application Priority Data

Mar. 20, 1989 [JP] Japan ................................. 1-067923

[51] Int. Cl.[5] ............................................. H04B 10/00
[52] U.S. Cl. ........................................ 359/189; 381/25; 320/2
[58] Field of Search ............... 455/619, 600, 603, 74; 381/25, 72, 74; 320/2; 200/2

[56] References Cited

U.S. PATENT DOCUMENTS

| | | | |
|---|---|---|---|
| 4,229,829 | 10/1980 | Grunwald | 455/600 |
| 4,543,665 | 9/1985 | Sotelo et al. | 455/606 |
| 4,633,498 | 12/1986 | Warnke et al. | 381/25 |
| 4,647,832 | 3/1987 | Fenne et al. | 320/2 |
| 4,845,751 | 7/1989 | Schwab | 381/25 |
| 4,899,388 | 2/1990 | Mlodzikowski et al. | 455/603 |
| 4,930,148 | 5/1990 | Lee | 381/74 |

FOREIGN PATENT DOCUMENTS

| | | | |
|---|---|---|---|
| 1591095 | 12/1970 | Fed. Rep. of Germany | 381/25 |
| 2431937 | 1/1976 | Fed. Rep. of Germany | 455/613 |
| 2652101 | 5/1978 | Fed. Rep. of Germany | 381/25 |
| 3406809 | 9/1985 | Fed. Rep. of Germany | |
| 3607885 | 9/1987 | Fed. Rep. of Germany | |
| 2151870 | 7/1985 | United Kingdom | |

OTHER PUBLICATIONS

Patent Associated Literature, Funkschau, vol. 48, No. 24, pp. 1063-1066, 19 Nov. 1976.

Primary Examiner—Reinhard J. Eisenzopf
Assistant Examiner—Kinfe-Michael Negash
Attorney, Agent, or Firm—Alvin Sinderbrand; Wiliam S. Frommer

[57] ABSTRACT

A wireless headphone in which an infra-red light signal transmitted from a transmitting apparatus is received and reproduced as an audible sound by a headphone unit portion. A first light receiving element is provided on a top portion of a head band portion of the headphone so that, when a listener wears the wireless headphone, a light receiving surface included in the first light receiving element is directed rearward. Second and third light receiving elements are provided on the pair of headphone unit portions so that, when the listener wears the wireless headphone light receiving surfaces included in the second and third light receiving elements are directed forward.

8 Claims, 7 Drawing Sheets

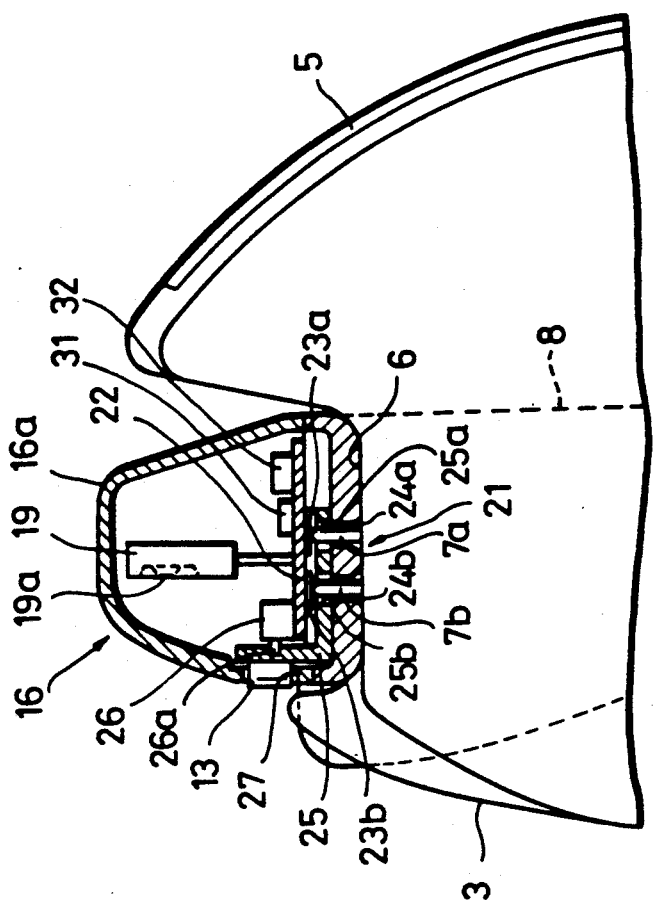
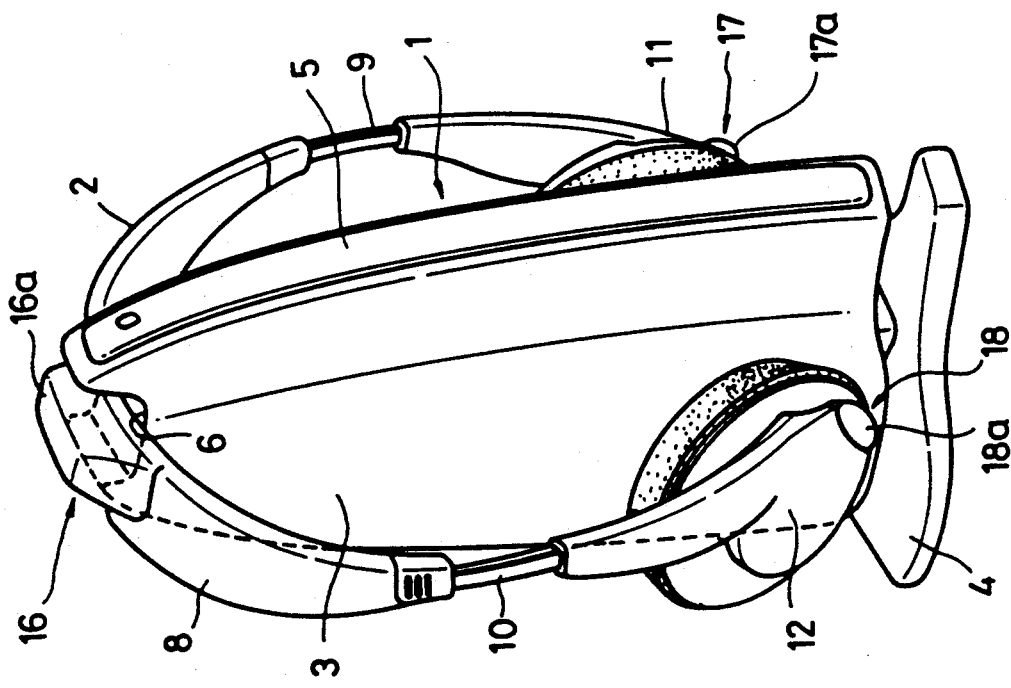
FIG. 6
FIG. 5

WIRELESS HEADPHONE

BACKGROUND OF THE INVENTION

1. Field of the Invention

The present invention relates generally to wireless headphones and, more particularly, is directed to a wireless headphone and a wireless headphone system in which a satisfactory receiving condition is always maintained regardless of the condition and position of the listener's head.

2. Description of the Prior Art

A wireless headphone system has recently been developed, in which a signal is transmitted through infra-red rays from a transmitter and received at a position remote from the transmitter, so as to enable a music program or the like to be enjoyed by a listener.

Japanese Laid-Open Patent Gazette No. 55-82596 describes a wireless headphone utilizing infra-red rays. According to this Laid-Open Patent, the headphone is a wireless-type headphone, so that the usable range in which the user can utilize the headphone is not limited by a headphone cord unlike other prior-art headphones. Further, the use of infra-red rays prevent the wireless headphone from interfering with other radio waves.

In the wireless headphone described in Japanese Laid-Open Patent Gazette No. 55-82596, an infra-red signal transmitted from a transmitter is received by a light receiving element provided on a top portion of a head band portion of the wireless headphone. A signal outputted from the light receiving element is supplied through an amplifier, a demodulating circuit and a reproducing circuit, which are powered by a power supply source such as a secondary battery or the like incorporated within the headphone, so as to demodulate and reproduce the received signal which is then fed to a headphone unit portion. As a result, the headphone unit portion derives a reproduced audible signal from the signal transmitted from the transmitter.

However, the light receiving element is provided only on the top portion of the head band portion, so that, when the listener wears this wireless headphone on his or her head, hairs may cancel the light receiving element. As a result the light receiving element may not be able to receive the infra-red light signal transmitted from the transmitter. In order to correct this problem, it has been proposed to mount the light receiving element on a hanger portion of the wireless headphone. However, this proposal does not fully remove the risk that the light receiving element will be hidden by hairs when the listener wears the wireless headphone. Further, the light receiving element on this wireless headphone can receive a light signal transmitted from only one direction, for example, a front direction. More specifically, because of the directivity of the light receiving element, it can not receive a transmitted light signal from, for example, a rearward direction unless faced in that direction or a signal which has reached the listener's head after having been reflected on a wall or the like. Accordingly, if the listener turns his or her head towards a direction different from the direction in which the transmitter is transmitting along, the transmitted light signal can not be received by the light receiving element, thereby interrupting the reproduced sound heard by the listener. Thus, the moveable range of the listener is severely limited, which decreases the advantages of the wireless headphone.

OBJECTS AND SUMMARY OF THE INVENTION

Accordingly, it is an object of the present invention to provide an improved wireless headphone which avoid the above-mentioned disadvantages in the prior art.

More specifically, it is an object of the present invention to provide a wireless headphone which can satisfactorily receive a transmitted light signal regardless of the position of the listener's head.

It is a further object of the present invention to provide a wireless headphone in which when a light receiving element is hidden by the listener's hairs, a transmitted light signal may be received by another light receiving element, thus assuring reception of the transmitted light signal by the wireless headphone.

It is yet a further object of the present invention to provide a wireless headphone in which charging terminals are closed in accordance with a switching operation for changing-over the operation of the wireless headphone so that, when the listener wears the wireless headphone, the charging terminals can be protected from being touched with hairs and the skin of the listener, so as to be protected from being smudged by oily components, thereby the corrosion of charging terminals and contact failure in the recharging-process is removed.

It is still a further object of the present invention to provide a wireless headphone and a wireless headphone system in which a transmitted light signal may be satisfactorily received regardless of the position of listener's head.

As a first aspect of the present invention, in a wireless headphone in which a transmitted light signal is received and reproduced as an audible signal, the wireless headphone comprising a headphone body having a head band portion to which are attached a pair of headphone unit portions; a plurality of light receiving elements included on the headphone body in which each of the receiving elements includes a respective light receiving surface for receiving the transmitted light signal, the plurality including a first light receiving element located on a top portion of the head band portion and having the light receiving surface face towards a first direction and a second light receiving element located on at least one of the pair of headphone unit portions and having the light receiving surface face towards a second direction which is different from the first direction; and reproducing means for receiving the light signal received by the respective light receiving surface and for processing the light signal to obtain the audible signal.

As a second aspect of the present invention, in a wireless headphone having charging terminals for charging a secondary battery included within the wireless headphone, the wireless headphone comprising: change-over switch means included in the headphone for selectively changing-over between an operable state, in which power is supplied form the battery to said headphone so as to turn on the headphone, and an inoperable state, in which power is inhibited from being supplied from the battery to the headphone so as to effectively turn off the headphone; and opening and closing means coupled to the switch means for respectively uncovering and covering the charging terminals in accordance with the operation of the switch means, the opening and closing means covering the charging terminals when the switch means switches the headphone to the operable state and the opening and closing means uncovering the charging terminals when the switch means switches the headphone to the inoperable state, so as to provide access to the charging terminals to allow the secondary battery to be recharged.

As a third aspect of this invention, an improved wireless headphone system for transmitting and receiving the signal from the transmitting means, in which the improvement comprises: the wireless headphone powered by a secondary battery and having a charging portion; and the transmitting means having terminal which are engageable with the charging portion for enabling recharging of the secondary battery.

BRIEF DESCRIPTION OF THE DRAWINGS

A better understanding of the objects, features and advantages of the present invention may be gained from the following detailed description of a preferred embodiment when read, in conjunction with the accompanying drawings, wherein:

FIG. 5 is a perspective view illustrating the wireless headphone of the present invention in a charging position;

FIG. 6 is a longitudinal diagrammatic view of a section of one portion of the wireless headphone of the present invention.

DETAILED DESCRIPTION OF A PREFERRED EMBODIMENT

A wireless headphone system and a wireless headphone according to an embodiment of the present invention will now be described with reference to the accompanying drawings.

Figure 1:
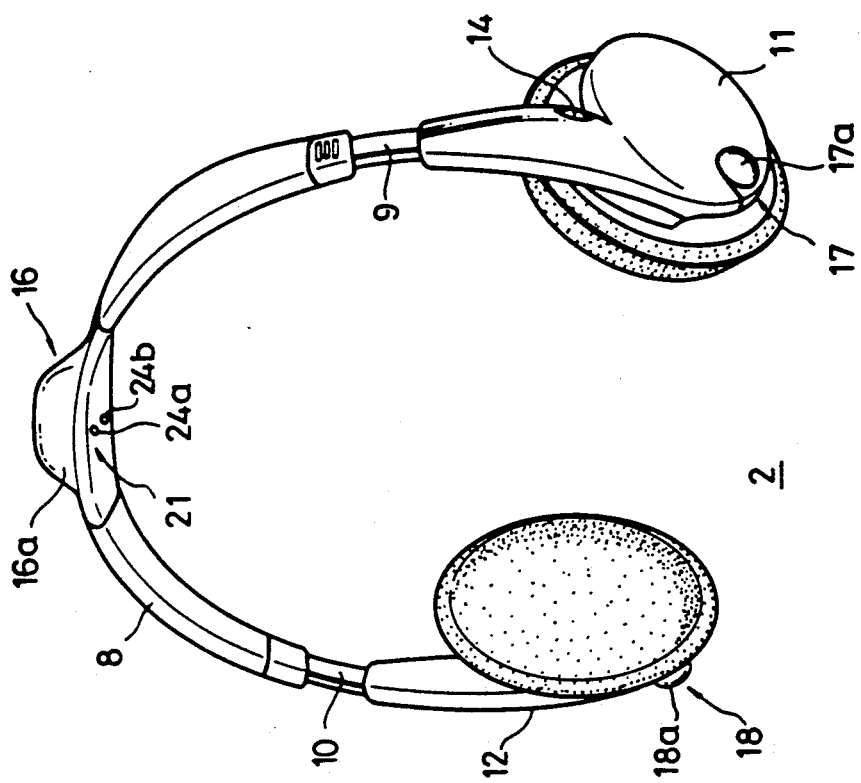
FIG. 1 is a schematic perspective view illustrating an embodiment of a wireless headphone system according to the present invention.
Figure 1:
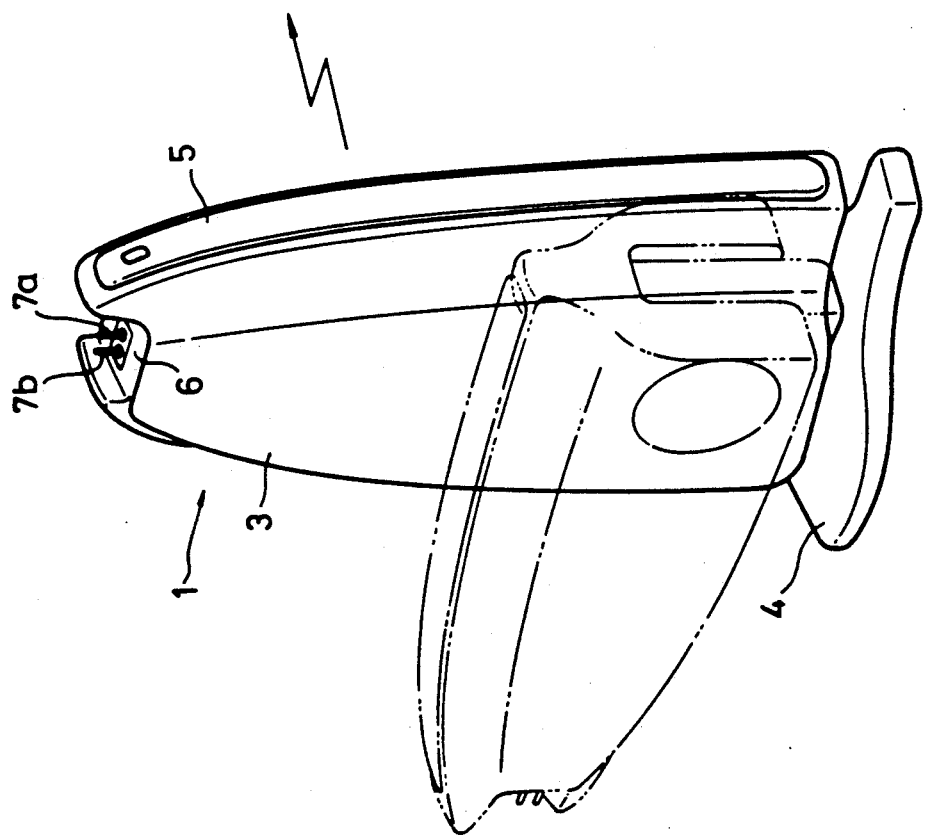
Figure 2:
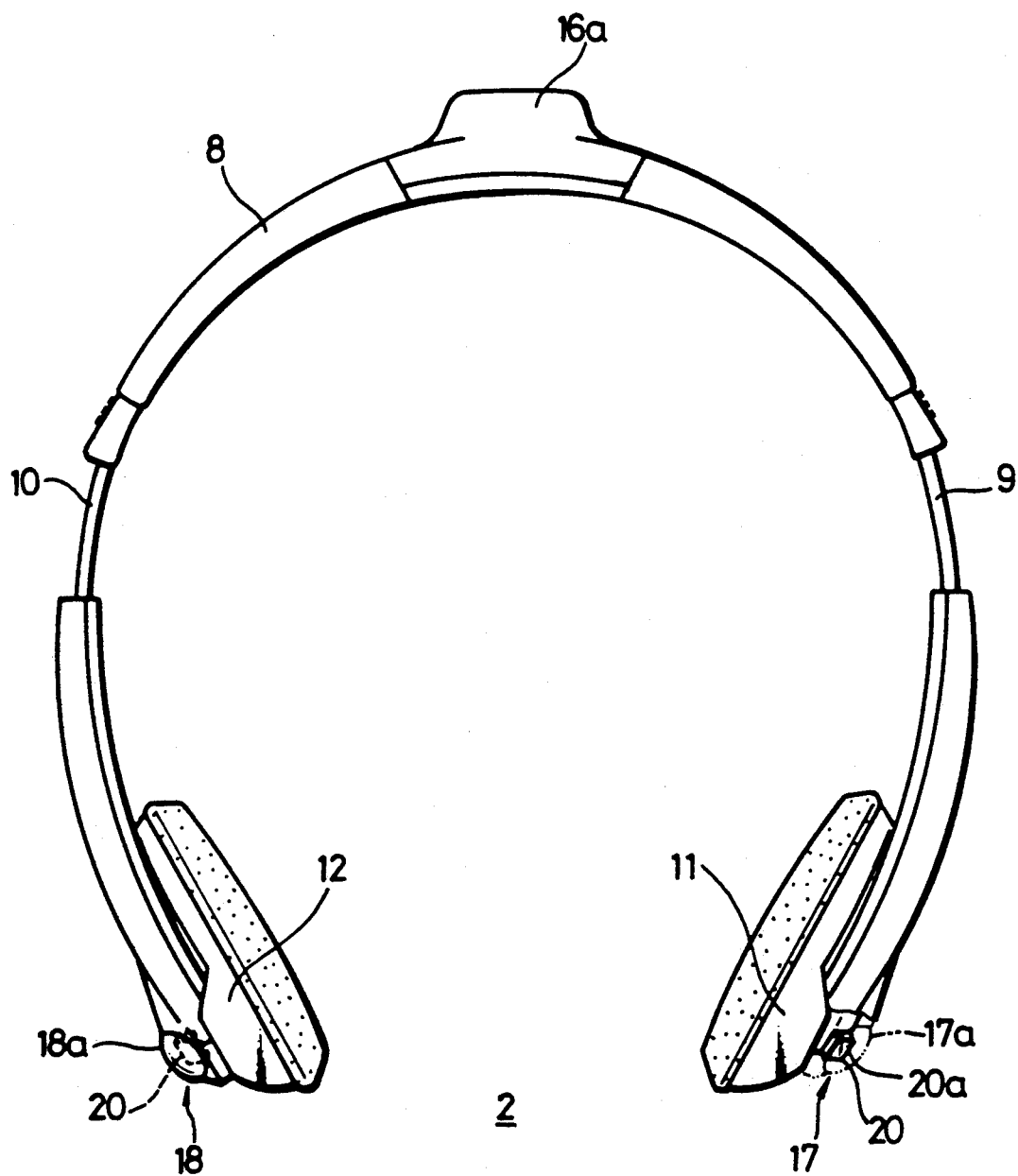
FIG. 2 is a front view of a wireless headphone of the present invention.
Figure 3:
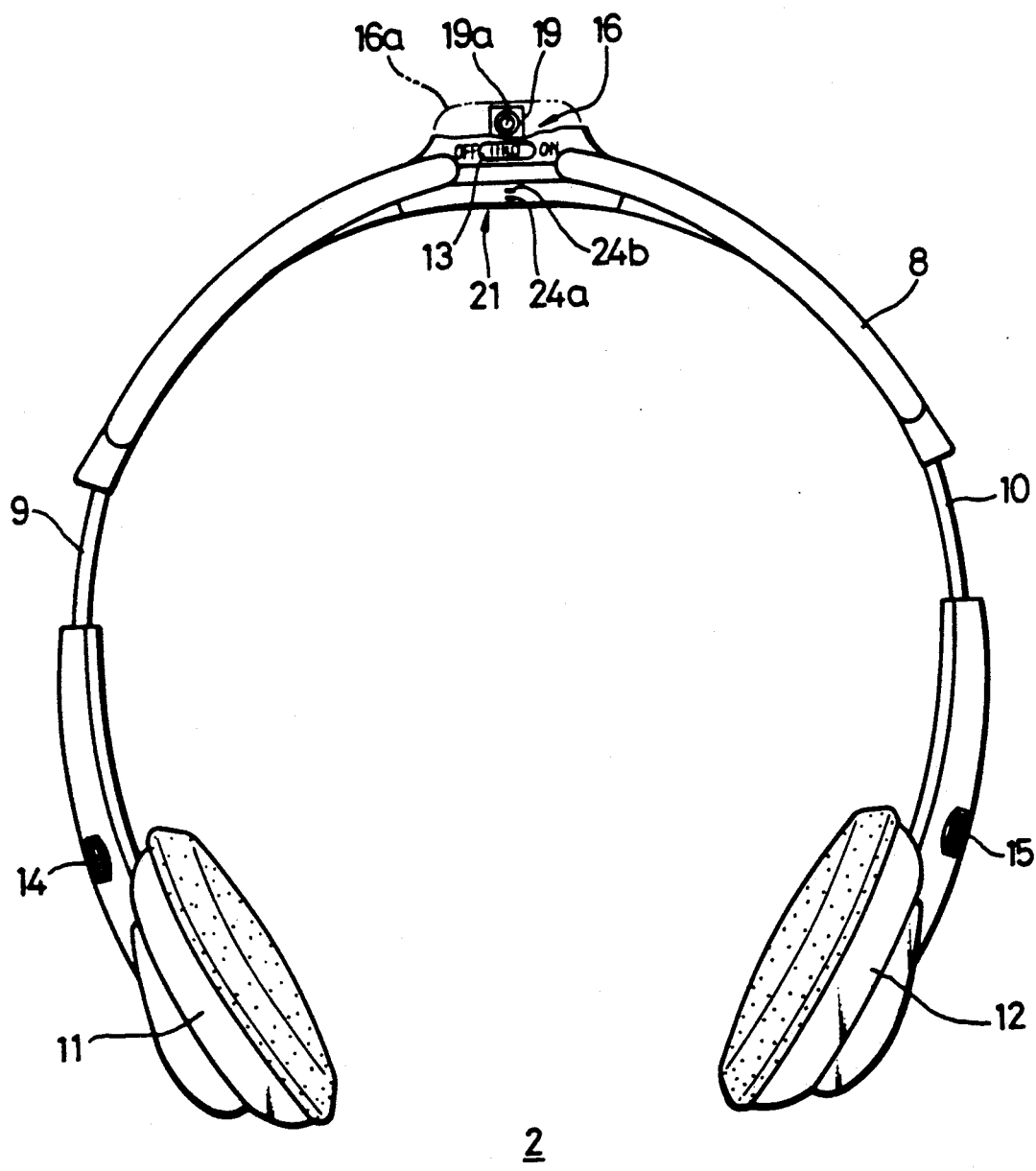
FIG. 3 is a rear view of the wireless headphone of FIG. 2.
Figure 4:
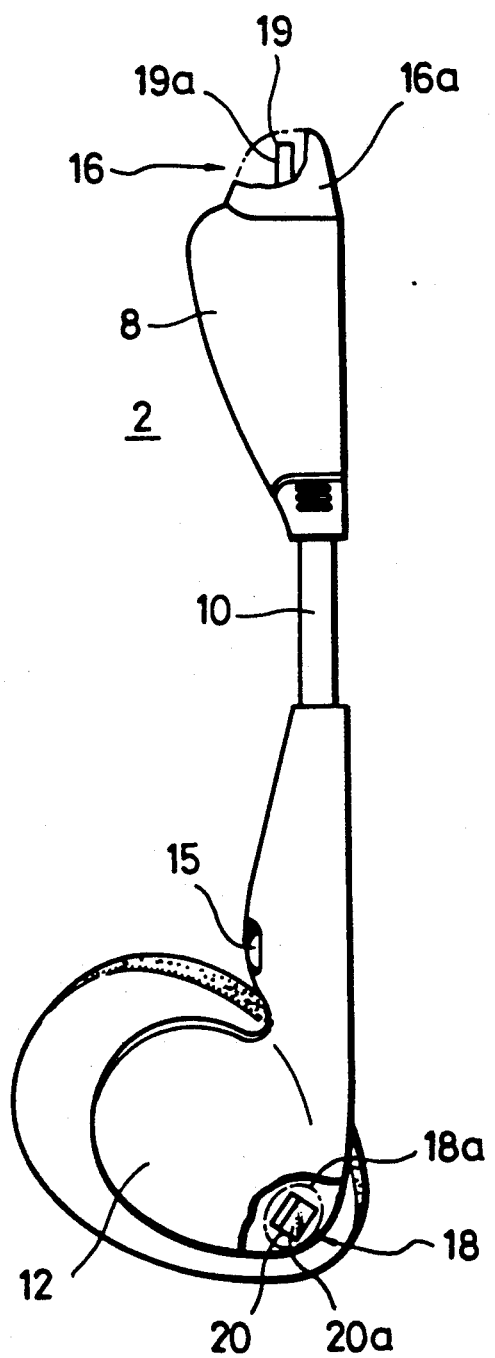
FIG. 4 is a side view of the wireless headphone of FIG. 2.

FIG. 1 illustrates a wireless headphone system according to an embodiment of the present invention, which comprises a transmitter 1 and a wireless headphone 2. A transmitted infra-red light signal transmitted from the transmitter 1 is received by the wireless headphone 2 which in turn, reproduces an audio signal from the received light signal and supplies the same to unit portions 11 and 12 so as to be heard by the listener. The wireless headphone is powered by a secondary battery (that is, a rechargeable battery), which may be recharged by a charging operation performed by transmitter 1 as will be described hereinafter.

The wireless headphone system of the present invention will now described more fully.

As shown in FIG. 1, the transmitter 1 is generally comprised of a transmitter body 3 and a leg or base 4 which supports the transmitter body 3. An audio signal is supplied transmitter body 3 from an audio apparatus or the like is used to modulate infra-red rays in a predetermined manner from an audio apparatus or the like through an input cable (not shown) to transmitter 1, whereupon the audio signal is so as to convert the audio signal to a modulated infra-red transmission light signal, which is transmitted from a light transmitting portion 5 of the transmitter 1. The transmitter body 3 is adapted to be rotatable relative to the base 4, so as to vary the direction, that is, the angle, in which the transmission light signal is transmitted.

The transmitter body 3 is further adapted to function as a charging apparatus for charging the secondary battery incorporated within the wireless headphone 2. More specifically, supply terminals 7a and 7b, which project outwardly from a recess-shaped concave portion 6 on the upper end portion of the transmitter body 3, are output terminals for the charging apparatus. Power signals are supplied from a power supply source (not shown), which may be of a conventional type, through a power supply cord (not shown) to transmitter body 3, whereupon the power signals are supplied to terminals 7a and 7b.

The wireless headphone 2 will now be described in more detail with reference to FIGS. 1-4.

As shown in FIG. 1, the wireless headphone 2 is generally comprised of a head band portion 8 and a pair of headphone unit portions 11 and 12, which are supported by the two end portions of the head band portion 8 through hanger portions 9 and 10, respectively. The headphone unit portions 11 and 12 each incorporate speakers therein (not shown). A slideable switch 13 (FIG. 3) turns ON and/or OFF the power supply source of the headphone 2. Dials 14 and 15 (FIG. 3) are used to adjust the sound volume.

Wireless headphone 2 is provided with light receiving portions 16, 17 and 18 at three portions of headphone 2, that is, the central top portion or top portion of the head band portion 8 and the front side portions of the left and right headphone unit portions 11 and 12. The light receiving portions 16, 17 and 18 are covered with filter caps 16a, 17a and 18a, respectively, which, in a preferred embodiment, are pervious only to infra-red signals.

The light receiving portion 16 provided on the top portion of the head band portion 8 includes a first receiving element 19 which, in turn, includes a light receiving surface 19a which is directed rearward so as to receive a transmitted light signal supplied from a rearward direction. The light receiving portions 17 and 18 provided in headphone unit portions 11 and 12 respectively, each include a second light receiving element 20. Each light receiving element 20 has a light receiving surface 20a which is oriented in a direction different from that of the first light receiving element 19, for example, each light receiving element 20 may be orientated so a to face in a front downwardly direction so as to receive a transmitted light signal supplied from a front direction. Upon receipt of a transmitted light signal by any one of the light receiving elements 19 and 20 of the three light receiving portions 16, 17 and 18, the received transmitted light signal is demodulated to provide an audio signal, which is reproduced by the headphone unit portions 11 and 12 as an audio sound.

The wireless headphone system and the wireless headphone of the present invention are constructed as described above enables reception of the transmitted light signal, even when the listener wearing the headphone (turns) his or her head in any direction, that is one of the three light receiving portions 16, 17 and 18 will receive the transmitted light signal.

The wireless headphone of the present invention utilizes a the secondary battery for supplying the drive power to the headphone as described above. The secondary battery is held within headphone 2, for example, within the headphone unit 11 or 12 (not shown). A rechargeable battery terminal portion 21 is provided at the central portion of the head band portion 8 and, when engaged with terminals 7a and 7b of transmitter body 3, is adapted to recharge the secondary battery.

More specifically, as shown in FIG. 6, electronic circuits 31 and 32, which may include an amplifying circuit and the like, are incorporated within the filter cap 16a on the top portion of the head band portion 8. A circuit board 22 is located within the filter cap 16a for supporting thereon the first light receiving element 19. On the lower side surface of the circuit board 22, are formed charging terminals 23a and 23b, which are adapted to function as input terminals for the secondary battery. Through-holes 24a and 24b are formed in the under wall of the head band portion 8 at its central portion and are positioned to be in-line with terminals 23a and 23b, respectively.

As shown in FIGS. 5 and 6, upon charging the central portion of the head band portion 8 of the wireless headphone 2 is placed in the recess concave portion 6 of the transmitter body 3, whereupon the supply terminals 7a, 7b of the transmitter body 3 are inserted through the through-holes 24a and 24b into headphone 2 until properly seated, that is, until, the tops of the supply terminals 7a and 7b are respectively connected to the charging terminals 23a and 23b. The charging circuit (not shown) provided within the transmitter body 3, which may be operated automatically or manually and may be of conventional design, enables a charging current to be supplied from the supply terminals 7a and 7b through the charging terminals 23a and 23b to the secondary battery in headphone 2. During the charging operation, the wireless headphone 2 may be oriented in the recess concave portion 6 of the transmitter body 3 as shown in FIG. 5 or may be in a reverse orientation. In other words, the charging operation can be effected regardless of the polarities of the supply terminals 7a, 7b and the recharging terminals 23a, 23b.

An opening and closing plate member 25 is provided in charging terminal portion 21 between the charging terminals 23a, 23b and the through-holes 24a, 24b and is adapted to open and close so as to uncover and cover, respectively, the charging terminals 23a, 23b. The opening and closing plate member 25 is operated in a ganged like relationship with the ON and OFF operations of the power supply source of the wireless headphone 2. More specifically, a slide switch 26 for selectively turning ON and OFF the power for the wireless headphone 2 is secured to the circuit board 22. The opening and closing plate member 25 is coupled at its vertical surface portion formed on one end thereof to a slide contact 26a of the slide switch 26. The switch knob 13 is formed unitarily with the vertical surface portion of the opening and closing plate member 25 and is exposed to the outside through a rectangular opening 27 in filler cap 16a. As a result, when the switch knob 13 is selectively moved right and left by a listner, the slide switch 26 is actuated to change-over the operating condition of the wireless headphone 2, that is, to turn the power supply within the headphone "ON" or "OFF" accordingly, and simultaneously, the opening and closing plate member 25 is moved right and left so as to cover and uncover terminals 23a and 23b.

Figure 7A:
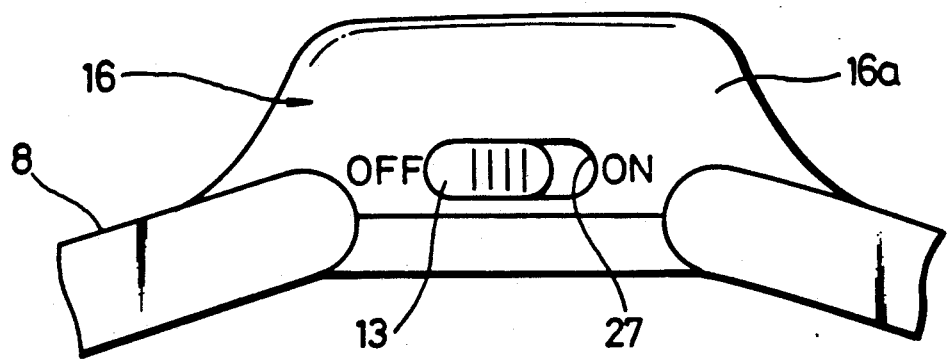
FIGS. 7A to 7C and FIGS. 8A to 8C are schematic diagrams to which reference will be made in explaining operation and arrangement of a portion of the present invention.
Figure 7B:
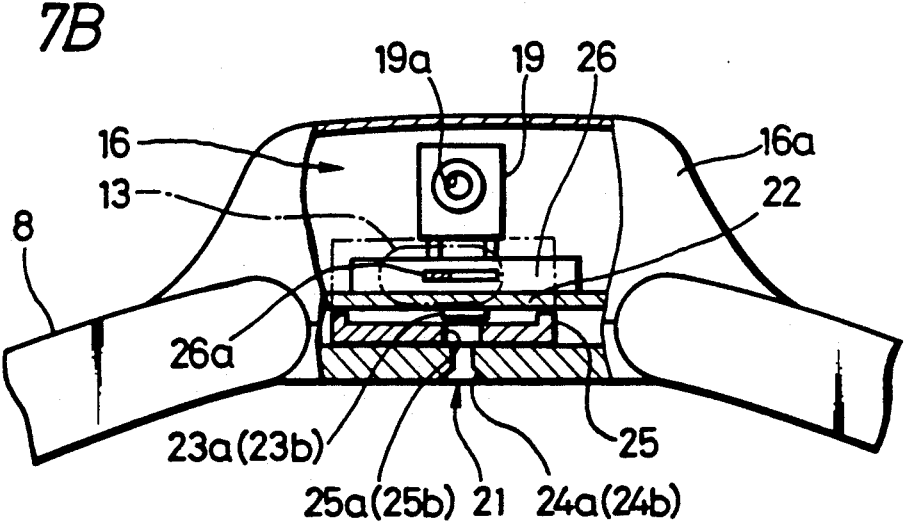
Figure 7C:
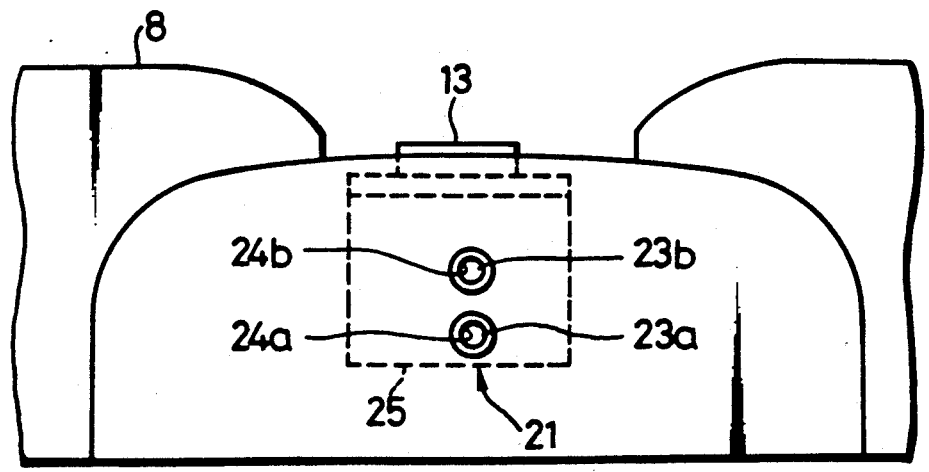

Through-holes 25a and 25b are in opening and closing plate member 25 and are selectively in-line with through-holes 24a and 24b, respectively, more specifically, when switch knob 13 is placed in the OFF position, that is when the wireless headphone 2 is in the inoperable state, the through-holes 25a, 25b are respectively positioned to be substantially coincident with the through-holes 24a, 24b. As a result, the charging terminals 23a and 23b are exposed, thereby permitting the recharging of the secondary battery through the use of transmitter body 3 as previously described. FIGS. 7A, 7B and 7C illustrate the relative positioning of through-holes 24a and 24b, and through-holes 25a and 25b when switch knob 13 is in the OFF position.

Figure 8A:
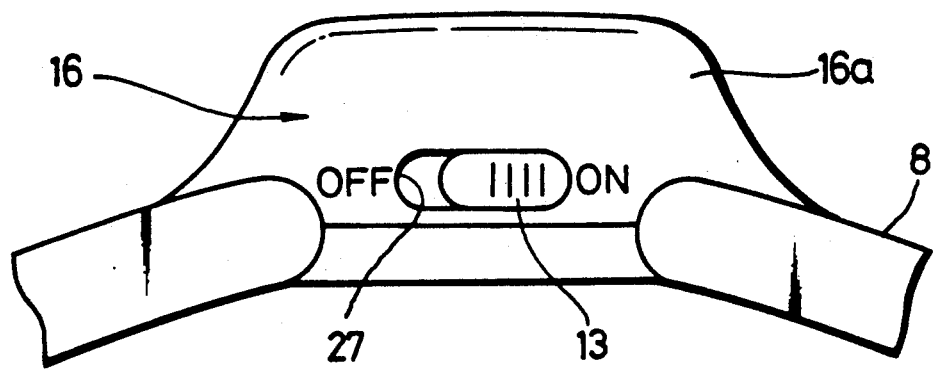
Figure 8B:
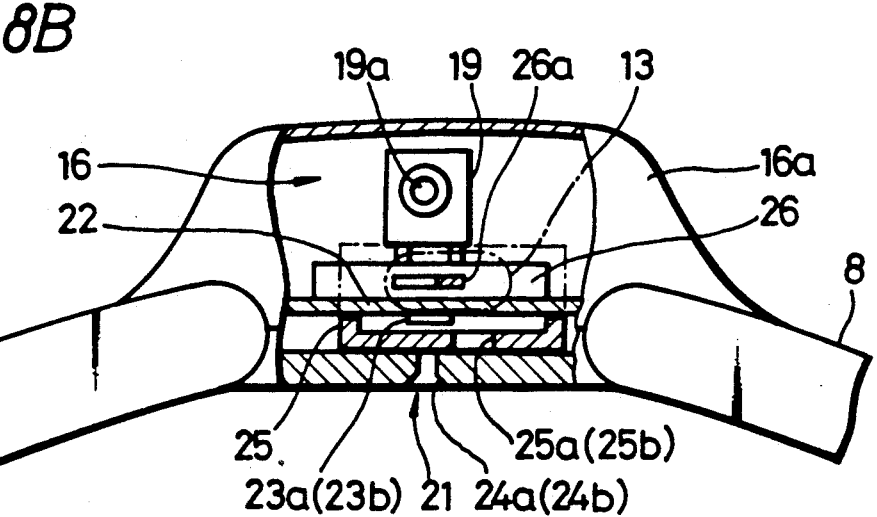
Figure 8C:
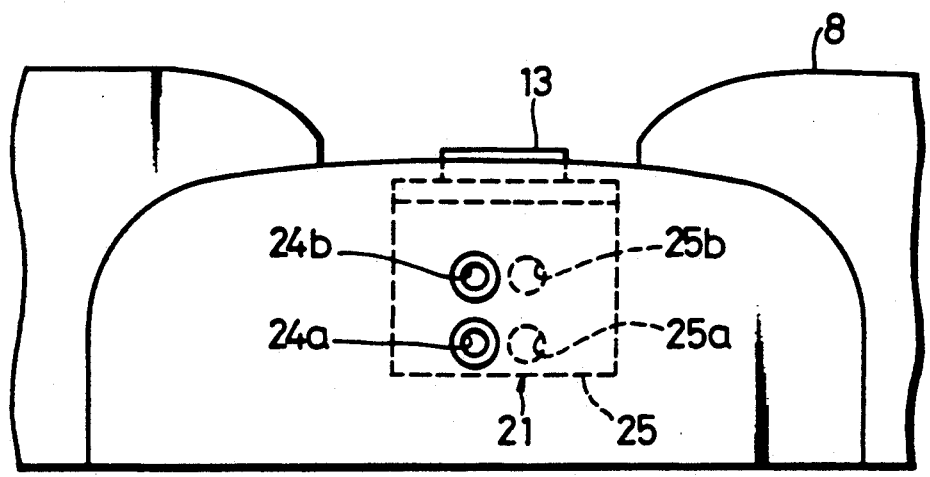

On the other hand, when the switch knob 13 is in the ON position, that is when the wireless headphone 2 is placed in the operable state, the through-holes 25a, 25b are positioned so as not to be coincident with the through-holes 24a, 24b by the movement of the opening and closing plate member 25. As a result, the charging terminals 23a and 23b are covered by the opening and closing plate member 25. FIGS. 8A, 8B and 8C illustrate the relative positioning of through-holes 24a and 24b, and through-holes 25a and 25b when switch knob 13 is in the ON position. Therefore, in the ON state, even when the listener wears wireless headphone 2 on his or her head, the listener's hairs or skin are prevented from contacting charging terminals 23a and 23b by way of through-holes 24a and 24b.

Therefore, in wireless headphone 2, three light receiving portions 16, 17 and 18 are provided on the top portion of the head band portion 8 and on the respective headphone unit portions 11 and 12, as previously described. As a result, even when one of the light receiving portions is hidden by the listener's hair, another light receiving portions is likely to be able to satisfactorily receive the transmitted light signal from the transmitter 1. Further, the light receiving portion 16 provided on the top portion of the head band portion 8 includes the light receiving element 19 whose light receiving surface 19a is directed in a rearward direction and the light receiving portions 17 and 18 of the two headphone units 11 and 12 each include light receiving element 20 whose light receiving surfaces 20a are directed in the right and left front directions so that, a light signal transmitted from any direction may be received by at least one of the light receiving elements 19 and 20. Therefore, regardless of the direction in which a listener's head, who is wearing the wireless headphone 2, is facing, a satisfactory receiving condition is always maintained.

Furthermore, the second light receiving elements 20 provided in the headphone units 11 and 12 are arranged so that their light receiving surfaces 20a are orientated along lower front directions, thereby enabling wireless headphone 2 of the present invention to receive the transmitted light signal from the transmitter 1 even while the listener wearing wireless headphone 2 is lying down.

While one embodiment of the present invention is described above, the present invention is not so limited and various changes and modification may be effected therein. For example, in the aforedescribed embodiment, the light receiving surface 19a of the first light receiving element 19 provided on the top portion of the head band portion 8 is directed rearward and the light receiving surfaces 20a of the second light receiving elements 20 provided on the headphone unit portions 11 and 12 are directed forward, however this arrangement may be reversed, that is, the light receiving surface 19a of the first light receiving element 19 may be directed forward and the light receiving surfaces 20a of the second light receiving elements 20 may be directed rearward.

Further, as previously described in the above embodiment, the top portion of the head band portion of wireless headphone 2 has a first light receiving element with a light receiving surface directed in one direction and at least one of the left and right headphone unit portions has a second light receiving element with a light receiving surface directed in a direction different from that of the first light receiving element so that, even when the listener's head is directed in any direction, the transmitted light signal may be received by one of the light receiving elements. Further, even when one of the light receiving elements is hidden by the listener's hairs or the like, the transmitted light signal may be received by one of the other light receiving elements. Therefore, a listener using the wireless headphone of the present invention is assured that a satisfactory receiving condition is always maintained.

Furthermore, according to the wireless headphone of the above-described embodiment, the charging terminals are selectively covered or uncovered in accordance with the operation of the ON-OFF switch. As previously described, the covering and uncovering of the charging terminals is performed by the opening and closing plate member, which is coupled in a ganged-like relationship with the ON-OFF switch. For example, when the switch is in the ON position, the charging terminals are covered, so that the hairs or skin of the listener wearing the wireless headphone are prevent from touching the charging terminals. Thus, the charging terminals are protected from being smudged by oily components or the like, which may corrode charging terminals an cause a malfunction in the charging operation.

Having described a preferred embodiment of the invention with reference to the accompanying drawings, it is to be understood that the invention is not limited to that precise embodiment, and that various changes and modifications could be effected therein by one skilled in the art without departing from the spirit or scope of the invention as defined in the appended claims.

I claim as my invention:

1. A wireless headphone having charging terminals for charging a secondary battery included within said wireless headphone, said wireless headphone comprising:

change-over switch means included in said headphone for selectively changing-over between an operable state, in which power is supplied from said secondary battery to said headphone so as to turn on said headphone, and an inoperable state, in which power is inhibited from being supplied from said secondary battery to said headphone so as to effectively turn off said headphone; and opening and closing means coupled to said switch means for respectively uncovering and covering said charging terminals in accordance with the operation of said switch means, said opening and closing means covering said charging terminals when said switch means switches said headphone to said operable state and said opening and closing means uncovering said charging terminals when said switch means switches said headphone to said inoperable state, so as to provide access to said charging terminals to allow said secondary battery to be recharged.

2. A wireless headphone according to claim 1, wherein said charging terminals are located on said headphone at positions which are adjacent to a listener's head when said listener wears said headphone.

3. A wireless headphone according to claim 2, wherein said headphone includes a head band portion and, in which, said charging terminals are located on an inner surface side of said head band portion.

4. A wireless headphone according to claim 1, wherein said opening and closing means includes a switch knob which is slidably provided on said headphone and, in which said change-over switch means is operated in response to the slidably movement of said knob.

5. An improved wireless headphone system for transmitting and receiving a signal having transmitting means for transmitting said signal and a wireless headphone including receiving means for receiving said signal from said transmitting means, in which the improvement comprises:

said wireless headphone powered by a secondary battery and having a charging portion; and said transmitting means having terminals which are engageable with said charging portion for enabling recharging of said secondary battery.

6. A wireless headphone system according to claim 5, wherein said secondary battery operates said receiving means and said transmitting means includes charging means for charging said secondary battery.

7. A wireless headphone system according to claim 6, wherein said charging portion includes charging terminals and said terminals of said transmitting means are output terminals for said charging means.

8. A wireless headphone system according to claim 5, wherein said transmitting means includes a transmitting portion arrangeable to adjust the angle at which said signal is transmitted.

* * * * *